No. 748,684. PATENTED JAN. 5, 1904.
C. ANDERSEN & W. C. WELLS.
VEHICLE WHEEL.
APPLICATION FILED SEPT. 21, 1903.
NO MODEL.
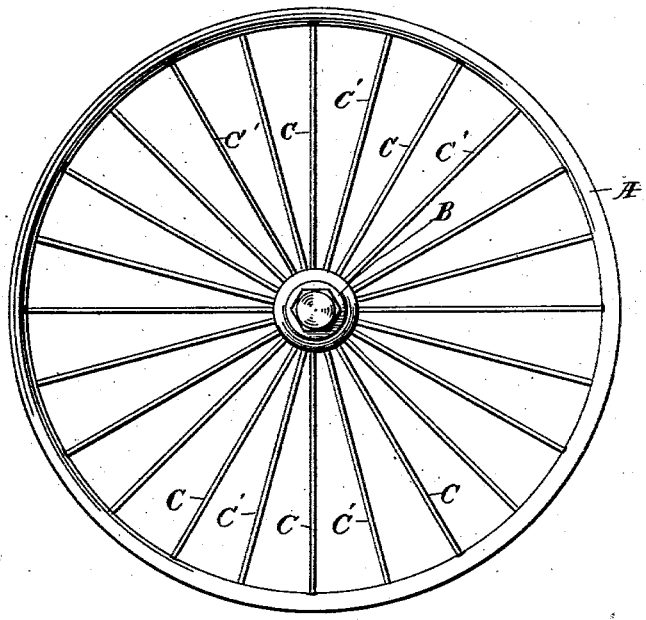
Fig. 1.
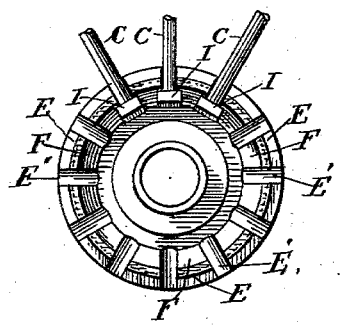
Fig. 4.
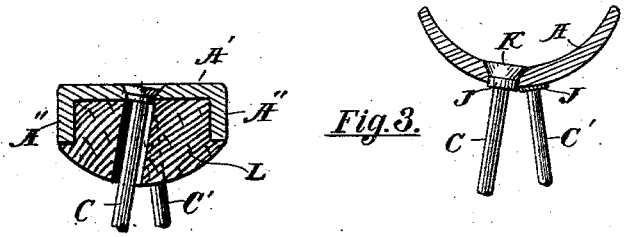
Fig. 3.
Fig. 6.
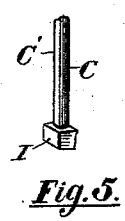
Fig. 5.
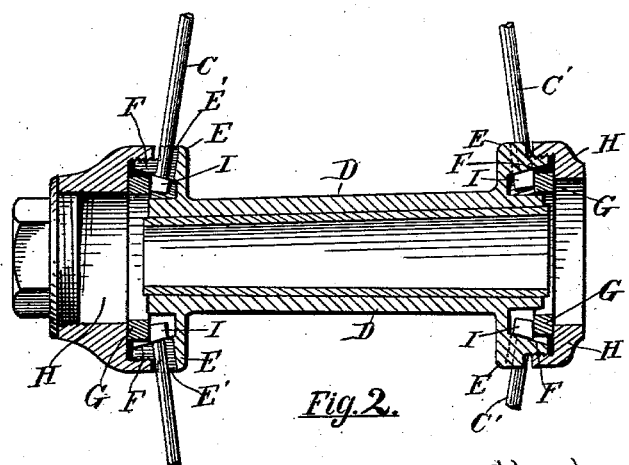
Fig. 2.
Witnesses
Palmer A. Jones.
Georgiana Chace.
Inventors
Charles Andersen
William C. Wells
By Luther V. Moulton
Attorney
THE NORRIS PETERS CO., PHOTO-LITHO., WASHINGTON, D. C.

No. 748,684.

Patented January 5, 1904.

UNITED STATES PATENT OFFICE.

CHARLES ANDERSEN AND WILLIAM C. WELLS, OF GRAND RAPIDS, MICHIGAN, ASSIGNORS OF ONE-THIRD TO JOHN G. CARROLL, OF GRAND RAPIDS, MICHIGAN.

VEHICLE-WHEEL.

SPECIFICATION forming part of Letters Patent No. 748,684, dated January 5, 1904.

Application filed September 21, 1903. Serial No. 173,964. (No model.)

*To all whom it may concern:*

Be it known that we, CHARLES ANDERSEN and WILLIAM C. WELLS, citizens of the United States, residing at Grand Rapids, in the county of Kent and State of Michigan, have invented certain new and useful Improvements in Vehicle-Wheels; and we do hereby declare the following to be a full, clear, and exact description of the invention, such as will enable others skilled in the art to which it appertains to make and use the same.

Our invention relates to improvements in vehicle-wheels; and its object is to provide a simple, strong, and durable structure, to provide the same with improved means for tightening the spokes, to provide a device in which heavy spokes may be used without being bent or screw-threaded to weaken the same, and to provide the device with certain new and useful features hereinafter more fully described, and particularly pointed out in the claims, reference being had to the accompanying drawings, in which—

Figure 1 is an elevation of a wheel embodying our invention; Fig. 2, a section of the hub through the axis of the same and on an enlarged scale; Fig. 3, a section detail of the rim and portions of the spokes; Fig. 4, an end elevation of the hub with one cap and a portion of the spokes removed; Fig. 5, a detail of the hub end of one of the spokes, and Fig. 6 a sectional detail of a modified rim.

Like letters refer to like parts in all of the figures.

A represents the rim of the wheel of any convenient form, the form shown being concavo-convex in cross-section to receive the usual pneumatic tire. In some cases it is desirable to use a tire with a metallic surface, in which case we provide the construction shown in Fig. 6, in which a channeled rim A', of metal, is provided with inwardly-projecting flanges A'', and a wood filling L is provided between these flanges, as shown, whereby the metal rim and flanges engage ground, and the wood filling prevents taking up any earth between the flanges, and the flanges strengthen the rim and retain the wood filling in place.

B is the hub, C the spokes attached to the outer end of the hub, and C' the spokes attached to the inner end of the hub. These spokes are preferably straight rods of any convenient size and material and provided at the rim end with an enlargement J and truncated conical head K, as shown in Fig. 3. The enlargement J, however, may be omitted; but it is necessary that the end be so formed and of proper size to be held in the opening in the rim A and of such size as to require an opening in the rim that will permit the T-head I on the hub end of the spoke to pass through the said opening. This head I on the hub end may also be varied in shape, but is preferably formed substantially as shown.

D represents the barrel of the hub, upon the respective ends of which are outwardly-projecting cup-shaped flanges or cups E, provided with recesses E' to receive the spokes and having the inner surface F truncated conical and inclined to the axis of the hub to a greater extent than are the spokes C and C' inclined to the plane of the rim, whereby as the heads I are engaged therewith and forced inward by the ring G the spokes will be drawn longitudinally and all tightened simultaneously. The rings G are provided to simultaneously engage all of the heads I of the spokes, and the outside of the cups E are screw-threaded, and internally-screw-threaded caps H are provided, which have central openings to receive the axle of the vehicle, and are screw-threaded upon the outside of the cups E, and thus force the rings G inward, together with the heads I of the spokes, and thus the spokes are securely held in place after being tightened longitudinally.

By making the spokes of uniform length throughout and the cups substantially alike the wheel will normally set up perfectly true without further attention. The spokes being straight and with headed ends, as described, there are no bent or screw-threaded portions to weaken the spokes, and they can be conveniently made of larger rods than if bent. A very strong wheel is thus secured at small expense.

We have shown means for tightening the spokes at each end of the hub; but it is obvious that the device is operative with such tightening means at one end of the hub only. We have also shown the preferred form of our device; but it is obvious that the same may be varied materially without departing from the substance of our invention.

Having thus fully described our invention, what we claim, and desire to secure by Letters Patent, is—

1. In a wheel, the combination of a hub having a cup-shaped end provided with inclined inner surfaces to engage the heads of the spokes and radial recesses to receive the spokes, a rim, spokes attached to the rim at their outer ends and having T-heads on their inner ends, and means for forcing said heads inward within the cup and retaining the same in place therein.

2. In a wheel, the combination of a rim, a hub, a cup-shaped end to the hub, and having a truncated conical inner surface and radial recesses, spokes attached to the rim and inserted in the recesses, T-heads on the spokes engaging the said truncated conical surface, screw-threads on the cup, and an internally-screw-threaded cap attached to the cup.

3. In a wheel, the combination of a hub, a rim, a cup on the end of the hub having a truncated conical inner surface, and recesses to receive the spokes, spokes attached to the rim and having heads engaging the inner surface of the cup, a ring to engage the heads, and means for forcing the ring against the heads.

4. In a wheel, the combination of a hub, a rim, a cup on the end of the hub and having a truncated conical inner surface and recesses, and an external thread, spokes attached to the rim and inserted in the recesses, heads on the spokes engaging the inner surface of the cup, a ring engaging the heads, and a screw-threaded cap attached to the cup and engaging the ring.

5. In a wheel, a straight spoke having a truncated conical head at the outer end and a T-head at the inner end, a rim having openings to fit the truncated conical head and permit the T-head to pass therethrough, a hub, a cup on the end of the hub having a truncated conical inner surface and radial recesses to receive the spokes, and means for forcing the T-heads of the spokes into the cup and holding the same in place therein.

6. In a wheel, the combination of straight spokes having an enlarged and truncated conical outer end and a T-head on the inner end, a rim having openings to fit the outer end of the spokes, and to permit the T-head to pass therethrough, a hub, a cup on the hub having radial recesses and a truncated conical inner surface, a ring to engage the heads of the spokes, and means for forcing the ring into the cup and holding the same in place therein.

7. In a wheel, straight spokes having enlarged ends, a rim having openings to fit the outer enlargement of the spoke and permit the inner enlargement to pass therethrough, a hub, a cup on the end of the hub and having radial recesses and an inclined inner surface to engage the spokes, and means for forcing the enlarged inner ends of the spokes inward within the cup and retaining the same in place therein.

8. In a wheel, the combination of straight spokes, enlarged and truncated conical ends on the outer ends of said spokes, T-heads on the inner ends of the same, a rim having openings to engage and hold the outer ends of the spokes and to permit the inner ends to pass therethrough, a hub, cups on the ends of the hub having radial recesses and inclined inner surfaces, rings to engage the heads on the inner ends of the spokes, and screw-threaded caps attached to the cups and engaging the rings.

In testimony whereof we affix our signatures in presence of two witnesses.

CHARLES ANDERSEN.
WILLIAM C. WELLS.

Witnesses:
LUTHER V. MOULTON,
GEORGIANA CHACE.